(12) United States Patent
Oosterling

(10) Patent No.: US 6,213,052 B1
(45) Date of Patent: Apr. 10, 2001

(54) DEVICE AND METHOD FOR MILKING ANIMALS

(75) Inventor: Pieter Adriaan Oosterling, Nieuw-Vennep (NL)

(73) Assignee: Prolion B.V., Vijfuizen (NL)

( * ) Notice: Subject to any disclaimer, the term of this patent is extended or adjusted under 35 U.S.C. 154(b) by 0 days.

(21) Appl. No.: 09/171,888

(22) PCT Filed: Apr. 29, 1997

(86) PCT No.: PCT/NL97/00234

§ 371 Date: Oct. 28, 1999

§ 102(e) Date: Oct. 28, 1999

(87) PCT Pub. No.: WO97/40663

PCT Pub. Date: Nov. 6, 1997

(30) Foreign Application Priority Data

Apr. 29, 1996 (NL) .................................................... 1002968

(51) Int. Cl.[7] .................................................... A01K 1/12
(52) U.S. Cl. .................................... 119/14.08; 119/14.02; 119/14.03; 119/14.14; 119/520
(58) Field of Search ............................ 119/14.08, 14.03, 119/14.14, 14.02, 516, 518, 520, 524, 523, 521

(56) References Cited

U.S. PATENT DOCUMENTS

| | | | |
|---|---|---|---|
| 2,269,012 | * | 1/1942 | De Carli ........................ 119/14.03 |
| 3,460,515 | * | 8/1969 | Page et al. ..................... 119/14.04 |
| 3,703,884 | * | 11/1972 | Maddalena et al. ............. 119/520 |
| 3,783,830 | * | 1/1974 | Holm ............................. 119/14.03 |
| 5,595,144 | * | 1/1997 | Loher ............................. 119/840 |
| 5,628,284 | * | 5/1997 | Sheen et al. .................... 119/840 |
| 5,803,015 | * | 9/1998 | Rhodes et al. ................. 119/14.02 |
| 5,959,526 | * | 9/1999 | Tucker .......................... 119/14.03 |

FOREIGN PATENT DOCUMENTS

| | | |
|---|---|---|
| 4313979 | 7/1979 | (AU) . |
| 0432148 | 6/1991 | (EP) . |
| 0562655 | 9/1993 | (EP) . |
| 734649 | * 10/1996 | (EP) . |
| 853875 | * 7/1998 | (EP) . |
| 2621345 | 4/1989 | (FR) . |
| 8104807 | 1/1982 | (NL) . |
| 8601297 | * 12/1987 | (NL) . |
| 97/37528 | * 10/1997 | (WO) . |

OTHER PUBLICATIONS

Starline, Inc. "Modern Plans and Equipment for Parlor Milking Systems." 1950. All pages.*

Database WPI, Week 8205, Accession No. 82–B1155E entitled "Cattle–driving method from stall—moves electrically—energised curtain over passage."

* cited by examiner

Primary Examiner—Peter M. Poon
Assistant Examiner—Son T. Nguyen
(74) Attorney, Agent, or Firm—Webb Ziesenheim Logsdon Orkin & Hanson, P.C.

(57) ABSTRACT

A device for milking animals having at least two milking stalls which are each provided with a movable entrance gate, a movable exit gate and a first spurring device to drive the animals out of the milking stalls, and a passageway along the entrance gates and the exit gates. The passageway is provided with a second spurring device for spurring on the animals in the passageway so that the milking stalls are quickly accessible again for the following animals and so that the capacity of the device is increased.

23 Claims, 2 Drawing Sheets

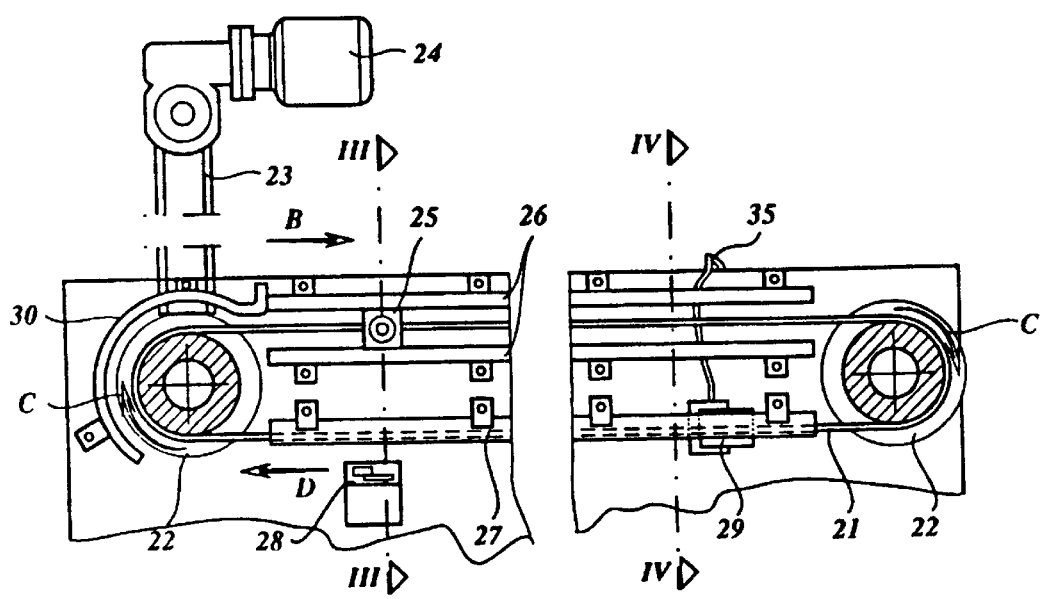
Fig. 2
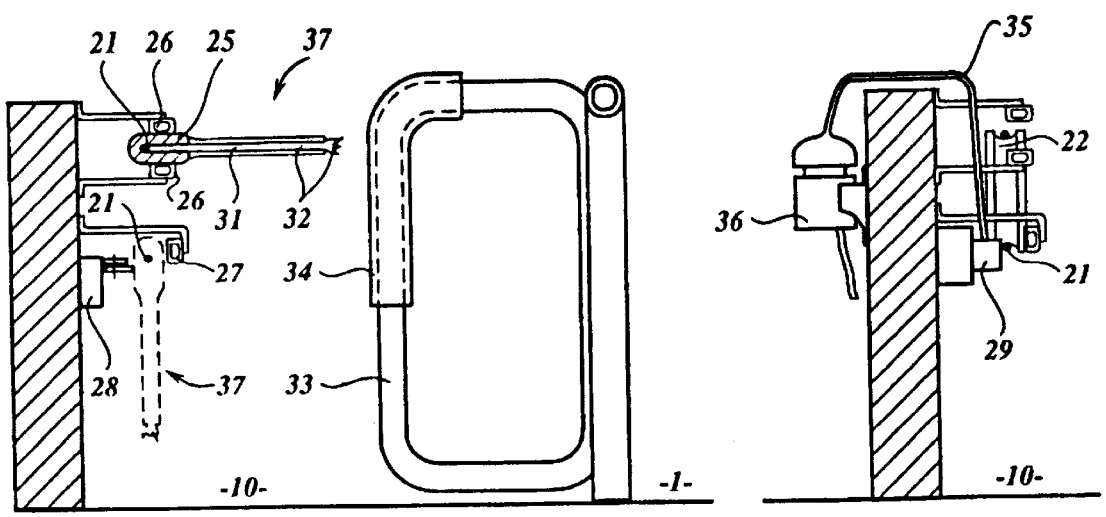
Fig. 3
Fig. 4

DEVICE AND METHOD FOR MILKING ANIMALS

BACKGROUND OF THE INVENTION

1. Field of the Invention

The invention relates to a device for milking animals having at least two milking stalls which are each provided with a movable entrance gate and a movable exit gate and spurring means to drive the animals out of the milking stalls, and a passageway along the entrance gates and the exit gates.

2. Description of the Prior Art

Such devices are known and are to be found in many dairy farms where cows are milked with automatic milking installations wherein for instance the milking apparatus is automatically removed from the udders and the cows are driven out of the milking stall.

One such device is known from EP-A-0 432 148 which discloses a pusher unit and pusher element for pushing animals from the fenced passageway towards milking stalls or back towards a waiting area. These pushers are used for pushing the animals through sorting gates.

The disadvantage of the known device is that an animal that has been milked may remain standing in the passageway, thereby preventing the next animal walking from the waiting area to the milking stall from being milked. It has appeared that animals may remain standing there although there is no eating or drinking available. This reduces the effective use of the milking stalls which is undesirable.

The invention aims to improve the effective use of the milking stalls and, therefore, the passageway is provided with spurring means for spurring on the animals to an accommodation area.

SUMMARY OF THE INVENTION

By providing the passageway with spurring means a milked animal is effectively stimulated to go to the accommodation area making it possible for animals to proceed from the waiting area to the milking stalls thereby improving the effective use of the milking stalls.

According to a further improvement the passageway is provided with detection means connected to a control for detecting the presence of animals in the passageway. In this way the spurring means need only to be activated when an animal remains standing in the passageway.

The invention also concerns spurring means for spurring an animal in a desired direction in the passageway. Such spurring means are known for instance from NL 8104807. The disadvantage of this known device is that the chains that may touch the animals are hanging permanently in the passageway. This means that during movement of the spurring means back towards the starting point there may be no animals in the passageway, otherwise they may panic or get frightened as they have learned that these chains might hurt them. For this, separate control measures are required which make the installation complicated and also prevents effective use of the spurring means.

In order to improve this the spurring means includes a movable spurring member having positioning means for making the spurring means protrude into the passageway only during movement in a desired direction. By positioning the movable spurring member only in one direction in the passageway it can be brought back to the starting position while there are animals in the passageway. This makes it possible to spur the animals that have just entered the passageway so that they can enter and use the passageway while the spurring member is brought back to its starting position.

According to a further improvement detection means are arranged on the movable spurring member. In this way the progress of the spurring member can be adapted to the presence and the walking speed of the animal in the passageway.

The invention also concerns a method for milking of animals. A method is for instance known from EP-A-0 432 148 for milking animals. The disadvantage of this method is that animals may remain standing in the passageway thereby preventing renewed use of the passageway for allowing an animal to enter a milking stall.

The invention aims to remove this disadvantage by using the method according to the present invention in which the spurring means is used to prompt the animal through the passageway. In this way, the animal leaves the passageway within a fixed period of time thereby improving efficiency.

In accordance with the invention this disadvantage may also be removed in another way by using detection means. In this way the movement of the animal in the passageway is monitored, so that there is no fixed waiting time (mostly based on the slowest animals). In this way the efficiency is further improved. ending of the milking these animals are driven out of the milking stall and are driven via a passageway to an accommodation area.

In the known method it is possible for animals to stand still in the passageway, whereby the capacity of the milking device is unnecessarily limited.

According to the invention an improvement is achieved here in that following a time adjustable in a control after the animals have left the milking stall they are prompted to walk with automatically operating spurring means.

By prompting the animals to walk at an adjustable time after leaving the milking stall they learn this rhythm and will have less of a tendency to remain waiting in the passageway. This prevents stationary animals obstructing the access to a milking stall.

According to another method according to the invention improvement can likewise be achieved here in that the presence of animals in the passageway is determined with detection means and if this presence lasts longer than a time adjustable in a control after the animals have left the milking stall they are prompted to walk with automatically operating spurring means.

Determining the presence of the animals in the passageway with detection means results in an immediate response to an excessively long stay in the passageway, whereby the least possible time is lost.

A further improvement of the method is achieved in that the animals are spurred on by moving a movable member provided with stimulating means in a walking direction in the passageway. The animals are hereby driven in simple manner to the accommodation area.

The invention is elucidated hereinbelow with reference to the drawings.

BRIEF DESCRIPTION OF THE DRAWINGS

FIG. 2 shows a side view of a spurring device mounted in the milking device of FIG. 1;

FIG. 3 shows the section III—III of FIG. 2; and

FIG. 4 shows the section IV—IV of FIG. 2.

DETAILED DESCRIPTION OF THE PREFERRED EMBODIMENTS

Figure 1:
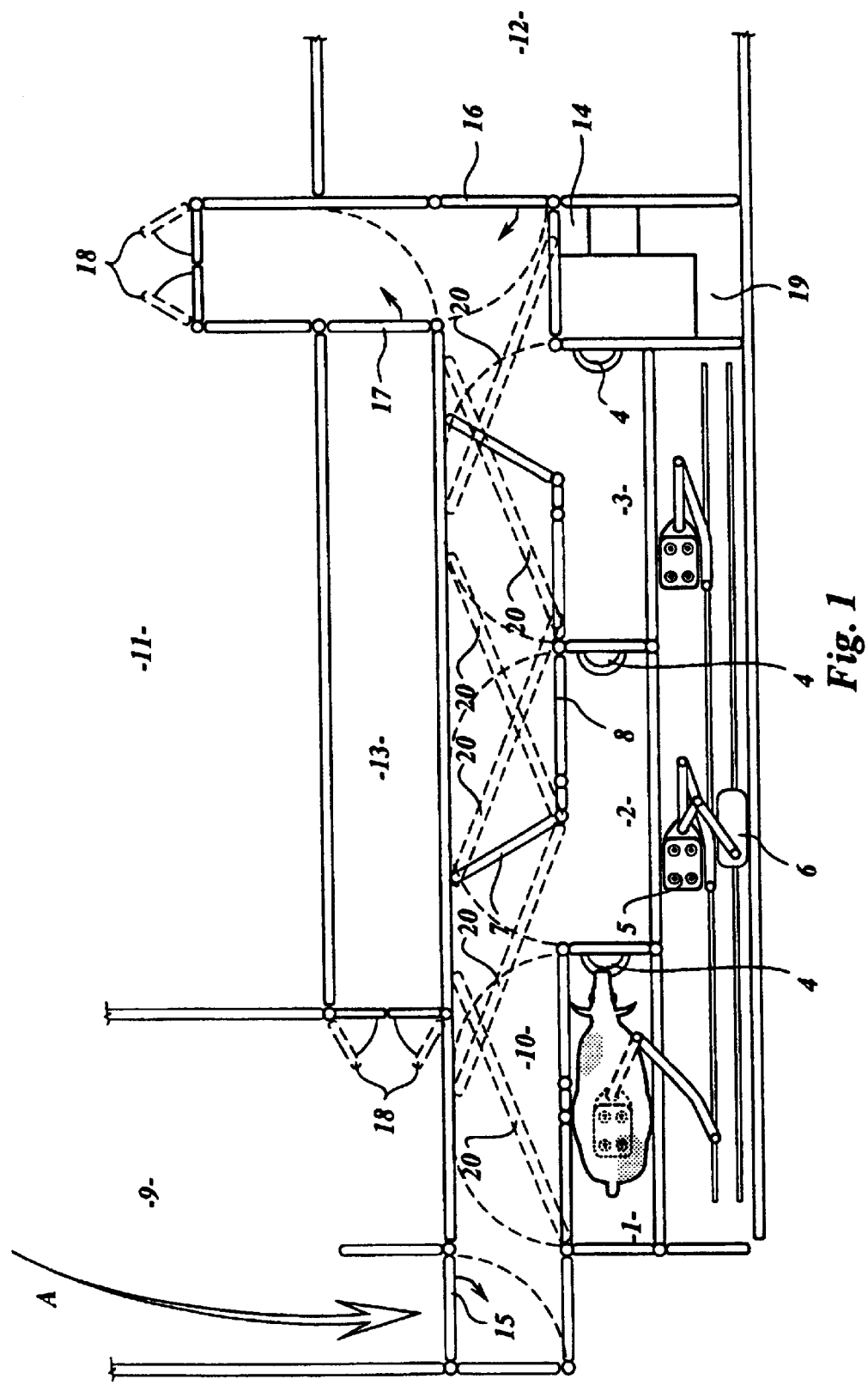
FIG. 1 shows a top view of a milking device for cows with three milking stalls.

In the different figures corresponding components are designated as far as possible with the same reference numerals.

In the milking device for cows shown in FIG. 1 a first milking stall 1, a second milking stall 2 and a third milking stall 3 are placed successively in line. A milking robot 6 can move on a rail along one of the long sides. Milking robot 6 can travel along the three milking stalls and can arrange teat cups placed on a milking rack 5 onto the udder of a cow present in one of the milking stalls 1, 2 or 3, wherein the animal, which during milking can eat from a feed trough 4, can be milked in the known manner such as is shown for instance in FIG. 1 in the first milking stall 1.

The cows present in a waiting area 9 walk in a walking direction A through an access gate 15 via a passageway 10 to one of the milking stalls and enter the milking stall, for instance as shown in FIG. 1 the second milking stall 2, through an entrance gate 7. After milking has ended and the teat cups released from the udder an exit gate 8 is opened, as shown at the third milking stall 3.

Simultaneously with opening of exit gate 8 the cow is urged out of the milking stall with pushers (not shown) and will enter and walk out of passageway 10 and walk via a one-way gate 18 to an accommodation area 11. By adjusting a separation gate 16 the cow can also be guided to a segregation area 12 or it is guided back to waiting area 9 via a return path 13 and a one-way gate 18 by adjusting a return gate 17.

The diverse components of the device are controlled by a control 14 placed in an auxiliary area 19.

Arranged in passageway 10 in front of the milking stalls are about two detection beams 20 per milking stall which consist for instance of infrared beams which run from an infrared transmitter (not shown) to an infrared receiver and with which the presence of cows in passageway 10 can be detected. The detection beams 20 are placed such that opening or closing of for instance an entrance gate 7 or an exit gate 8 does not result in a mistaken detection of for instance an animal.

The infrared transmitters and receivers are connected to the control 14 which controls the different components of the device and in which inter alia timers are incorporated which can monitor how long ago an animal was driven out of the milking stall or how long one or more of the detection beams 20 have been interrupted. As long as animals which have been milked are standing in passageway 10 no new animal will be admitted via access gate 15 since it is for instance not permitted for the entrance gate 7 of the third milking stall 3 to be opened if an already milked animal which has for instance just left the first milking stall 1 can thereby enter the third milking stall 3. It is therefore important to teach the animals to leave the passageway, for instance by spurring it to walk on at a set time after leaving the milking stall or by doing this when they have stood still for a set time in the passageway. Which method is preferred will depend on the conditions and the herd.

On the basis of the monitored time duration for which a detection beam 20 is interrupted and which detection beam is interrupted it can be determined whether one or more animals are standing still and where they are standing. On the basis hereof is established whether the spurring means as shown for instance in FIGS. 2–4 must be started up. This is the case for instance when an animal thus interrupts a detection beam for longer than 15 seconds.

In addition to the above described detection method with detection beams 20 the device can also be embodied with other detection means for establishing the presence of cows in passageway 10. It is for instance possible to embody the detection means by arranging sensors in the ceiling along the whole length of passageway 10 which can determine the presence of animals. This is possible for instance with ultrasonic distance sensors, with passive infrared detectors or with other known detection means with which the presence of living creatures in a space can be determined. The advantage of detectors arranged in a high position is that they are placed less vulnerably, will become fouled less quickly and the laying of cabling is simpler.

The spurring means are arranged along one of the sides of passageway 10 and comprise, as shown in FIGS. 2–4, an endless cord 21, for instance a woven cord, which is made conductive in known manner by interweaving stainless steel wire of 0.1 mm diameter therein and which is stretched round two guide wheels 22. These latter can rotate in a direction C and are driven by a drive 24 which is connected to one of the guide wheels 22 by means of a drive belt 23. In respect of cleaning of the milking stalls and passageway 10 the drive 24 is placed in a high position so that it can remain dry during spray cleaning.

Fixed round the endless cord 21 is a clamping block or clamping member 25, the sides of which are placed between an upper guide 26 during movement in a spurring direction B and are thereby guided such that a probe 37 fixed to clamping block 25 protrudes into the passageway 10. After passing over guide wheel 22 the clamping block 25 is also guided by a lower guide 27 during the movement in a return direction D such that the probe 37 hangs downward. Guides 26 and 27 herein ensure that animals and humans moving in the passageway 10 cannot accidentally contact the endless cord. In order to ensure that the probe is carried in the desired manner between the guide 26 a guide cam 30 is placed round one of the guide wheels 22.

During use the probe 37 lies at rest parallel to the wall at an end switch 28. At the moment cows must be prompted to move, the drive 24 is switched on by control 14 and guide wheel 22 begins to rotate in the direction C. Probe 37 will first move in direction D and, under the influence of guide cam 30, be carried between the guide 26 and move in the direction B. Probe 37 herein protrudes into the passageway and moves at a speed of about 17 m per minute, this speed being such that a cow can ensure that it is not touched by probe 37.

At the end of passageway 10 the probe is moved round a guide wheel 22 and will therein hang downward at a distance of about 3 cm from the wall without touching the ground. Probe 37 moves in direction D until the drive is brought to a stop by end switch 28 when it detects probe 37.

A high-voltage generator 36 will be switched on simultaneously with switch-on of drive 24, wherein the high voltage, for instance 10,000 V, is conducted via a high-voltage cable 35 and a wiper contact 29 to the endless cord 21. Fixed to the clamping block 25 of probe 37 which is clamped round cord 21 is a protective sheath 31 having therein a conductive core 32, which core protrudes out of protective sheath 31 on the side remote from clamping block 25 and can there thus be live with high voltage. This high voltage can contact the cows which are thereby strongly stimulated to walk away from the probe 37 and leave the passageway 10.

Since the conductive core 32 can contact a moving gate 33 and this would cause undesired electrical currents in the gates, gate 33 is provided with an insulating sheath 34.

Instead of spurring by means of high voltage, means can be arranged whereby the probe 37 will begin to flail mechanically during movement and thereby encourage the animals to move. This is possible for instance by mounting a toothed belt on the upper guide 26, which belt co-acts with mechanical means (not shown) arranged in the probe which consist for instance of a pinion in engagement with the toothed belt and a rotating flexible shaft to which flailing wires are fastened.

In order to prevent unnecessary agitation of cows provisions are arranged which ensure that cows do not begin to jostle each other unnecessary. It is for instance undesirable that in the case two cows are standing in passageway 10 the rear cow is spurred on by a probe 37 under high voltage moving along its body while it cannot walk on because another cow is blocking the way. The provisions can entail that the spurring means are not switched on when two cows are standing in passageway 10. Switch means (not shown) can also be arranged in probe 37 which break the connection between the high voltage and the extremity of probe 37 when the probe moves along an obstacle such as the body of a cow.

Provisions can also be arranged in the control which ensure that, if one of the entrance gates 7 or exit gates 8 opens and thereby obstructs the passage in passageway 10, the probe 37 then comes temporarily to a stop until the gate is closed again, the passageway 10 is again clear and the cows can again walk further.

In another embodiment of the milking device the detection means are arranged on the spurring means. This device operates as follows: on probe 37 of FIGS. 2–4 is arranged a sensor which gives a signal to the control 14 when probe 37 arrives close to or against a cow. The probe 37 periodically moving rapidly in walking direction B then acquires a lower speed so that the cow can continue to walk ahead of probe 37. Probe 37 can thus move at two speeds, wherein the high speed is switched on periodically in order to detect whether animals are standing in passageway 10 and, under the influence of the presence of animals, this high speed slows to below the walking speed of the cows.

The invention is not limited to the embodiments discussed here. The detection means and spurring means can thus be arranged at a plurality of locations, i.e. everywhere animals can obstruct each other's passage.

This is possible in the case of the known tandem stalls where the operator is mainly occupied with arranging milking sets and the cows leave the milking device individually and independently.

Particularly in situations where an operator is no longer present, such as in an automatic milking device wherein the teat cups are connected automatically to the teats of the udders, avoidance of stationary animals in the passageways is found to give an increase in capacity, not only in the passageway along the front of the milking stalls but also in other passageways where congestion can occur.

What is claimed is:

1. A device for automatic milking of animals with a milking robot, comprising:
   at least two milking stalls each provided with a movable entrance gate, a movable exit gate and first spurring means for driving milked animals out of the milking stalls, with a passageway located along the entrance gate and the exit gate of the milking stalls for connecting the milking stalls with a waiting area and an accommodation area; and
   a control preventing entry of animals to be milked from the waiting area to the passageway as long as milked animals are present in the passageway,
   wherein the passageway is provided with second spurring means for spurring milked animals to walk to the accommodation area,
   wherein the control is provided with timing means for activating the second spurring means after a pre-set duration of time, and
   wherein the second spurring means is located along one side of the passageway and is movable in a longitudinal direction in the passageway to urge milked animals present in the passageway toward the accommodation area.

2. The device as claimed in claim 1, wherein the passageway is provided with detection means connected to the control for detecting the presence of animals in the passageway.

3. The device as claimed in claim 1, wherein the second spurring means includes a movable spurring member provided with positioning means for making the spurring member protrude into the passageway only during movement of the spurring member in a desired direction.

4. The device as claimed in claim 3, wherein the movable spurring member is arranged on one of an endless belt and endless cable.

5. The device as claimed in claim 4, wherein the positioning means includes guide means for guiding the movable spurring member.

6. The device as claimed in claim 4, wherein detection means are arranged on the movable spurring member.

7. The device as claimed in claim 6, wherein the movable spurring member is movable at different speeds.

8. The device as claimed in claim 3, wherein the positioning means includes guide means for guiding the movable spurring member.

9. The device as claimed in claim 8, wherein detection means are arranged on the movable spurring member.

10. The device as claimed in claim 9, wherein the movable spurring member is movable at different speeds.

11. The device as claimed in claim 3, wherein detection means are arranged on the movable spurring member.

12. The device as claimed in claim 11, wherein the movable spurring member is movable at different speeds.

13. A method for milking of animals in an automatic milking device having at least two milking stalls and a milking robot, comprising the steps of:
   milking an animal in one of the milking stalls;
   driving the animal out of the milking stall with automatically operating first spurring means into a passageway connecting the milking stalls with a waiting area and an accommodation area; and
   prompting the animal to proceed through the passageway with automatically operating second spurring means located along one side of the passageway and movable in a longitudinal direction in the passageway,
   wherein the animal can freely walk to the accommodation area via the passageway,
   wherein the step of prompting the animal to proceed through the passageway occurs following a preselected period of time after the animal has left the milking stall, and
   wherein the preselected period of time is adjustable in a control.

14. The method as claimed in claim 13, further including the step of halting movement of the spurring means when a second animal is present in the passageway.

15. A method for milking of animals in an automatic milking device having at least two milking stalls and a milking robot, comprising the steps of:

milking an animal in one of the milking stalls;

driving the animal out of the milking stall with automatically operating first spurring means into a passageway connecting the milking stalls with a waiting area and an accommodation area;

prompting the animal to proceed through the passageway with automatically operating second spurring means located along one side of the passageway and movable in a longitudinal direction in the passageway; and monitoring progress of the animal toward the accommodation area, wherein the animal can freely walk to the accommodation area via the passageway, wherein the progress of the animal toward the accommodation area after leaving the milking stall is determined with detection means, wherein if the progress has stopped longer than a preselected period of time the animal is prompted to proceed through the passageway with the automatically operating second spurring means, and wherein the preselected period of time is adjustable in a control.

16. The method as claimed in claim 15, further including the step of halting movement of the spurring means when a second animal is detected in the passageway.

17. A device for automatic milking of animals with a milking robot, comprising:

at least two milking stalls each provided with a movable entrance gate and a movable exit gate and first spurring means for driving milked animals out of the milking stalls, with a passageway located along the entrance gate and the exit gate of the milking stalls for connecting the milking stalls with a waiting area and an accommodation area;

detection means located in the passageway for detecting the presence of animals in the passageway; and second spurring means located along one side of the passageway for spurring animals detected in the passageway in a longitudinal direction through the passageway to the accommodation area, the second spurring means further comprising an endless cord reeved about a pair of guide wheels and a movable spurring member attached to the endless cord with a clamping member.

18. The device as claimed in claim 17, further including a guide mounted on the side of the passageway having the spurring means, with the guide supporting the clamping member such that the spurring member protrudes into the passageway.

19. The device as claimed in claim 17, wherein the detection means includes one of ultrasonic and infrared sensors located in the passageway.

20. The device as claimed in claim 17, wherein the detection means is located adjacent each of the milking stalls, wherein the detection means comprise detection beams, and wherein there are at least two of the detection beams for each of the milking stalls.

21. The device as claimed in claim 17, wherein the detection means is located on the movable spurring member, and wherein the speed of the movable spurring member is controlled by the detection means.

22. The device as claimed in claim 17, wherein the movable spurring member is electrically conductive and connected to a high voltage generator.

23. The device as claimed in claim 17, wherein the movable spurring member comprises mechanical flailing means activated by movement of the spurring member.

* * * * *

UNITED STATES PATENT AND TRADEMARK OFFICE
CERTIFICATE OF CORRECTION

PATENT NO. : 6,213,052 B1
DATED : April 10, 2001
INVENTOR(S) : Pieter Adriaan Oosterling Page 1 of 1

It is certified that error appears in the above-identified patent and that said Letters Patent is hereby corrected as shown below:

<u>Column 2,</u>
Lines 26-27, after "further improved." delete the text beginning with "ending of the milking these animals are" and ending with "manner to the accommodation area."

Signed and Sealed this

Thirtieth Day of October, 2001

Attest:

*Attesting Officer*

NICHOLAS P. GODICI
*Acting Director of the United States Patent and Trademark Office*